United States Patent
Lin

(10) Patent No.: US 10,118,544 B1
(45) Date of Patent: Nov. 6, 2018

(54) BRAKE WARNING LIGHT

(71) Applicant: Wei-Tai Lin, Taipei (TW)

(72) Inventor: Wei-Tai Lin, Taipei (TW)

( * ) Notice: Subject to any disclaimer, the term of this patent is extended or adjusted under 35 U.S.C. 154(b) by 0 days.

(21) Appl. No.: 15/814,113

(22) Filed: Nov. 15, 2017

(51) Int. Cl.
| | | |
|---|---|---|
| *B60Q 1/44* | (2006.01) | |
| *B60Q 1/26* | (2006.01) | |
| *B60Q 1/30* | (2006.01) | |
| *B60Q 1/50* | (2006.01) | |
| *B60Q 1/52* | (2006.01) | |
| *B60R 25/104* | (2013.01) | |

(52) U.S. Cl.
CPC .............. *B60Q 1/44* (2013.01); *B60Q 1/2696* (2013.01); *B60Q 1/302* (2013.01); *B60Q 1/50* (2013.01); *B60Q 1/52* (2013.01); *B60R 25/104* (2013.01)

(58) Field of Classification Search
CPC .......... B60Q 1/444; B60Q 1/302; B60Q 1/50; B60Q 1/2607; B60Q 1/2696; B60Q 1/44; B60Q 1/52; B60R 25/104
USPC ............. 340/479, 467, 464, 478; 200/61.29; 40/591
See application file for complete search history.

(56) References Cited

U.S. PATENT DOCUMENTS

| | | | | |
|---|---|---|---|---|
| 5,504,472 A | * | 4/1996 | Wilson .................... | B60Q 1/444 |
| | | | | 188/DIG. 1 |
| 5,652,565 A | * | 7/1997 | Salcedas ................ | B60Q 1/302 |
| | | | | 340/467 |
| 6,150,933 A | * | 11/2000 | Matsumoto ............ | B60Q 1/444 |
| | | | | 340/467 |
| 9,855,889 B1 | * | 1/2018 | Mullis ....................... | B60T 7/00 |
| 2009/0066500 A1 | * | 3/2009 | Yu ............................ | B60Q 1/302 |
| | | | | 340/479 |

FOREIGN PATENT DOCUMENTS

| | | |
|---|---|---|
| CN | 101054074 | 10/2007 |
| DE | 3620599 | 12/1987 |
| EP | 0898521 | 10/2000 |
| JP | 4412664 | 2/2010 |
| JP | 4627423 | 2/2011 |

OTHER PUBLICATIONS

Taiwan Intellectual Property Office, "Office Action" dated Jul. 25, 2018.

* cited by examiner

*Primary Examiner* — Firmin Backer
*Assistant Examiner* — Munear T Akki
(74) *Attorney, Agent, or Firm* — WPAT, PC

(57) ABSTRACT

A brake warning light is applied to a rear portion of a vehicle and includes a left brake light, a right brake light and an extended brake light assembly. A first left segment of the left brake light is aligned with a first end of the extended brake light assembly along a direction of a first extension line. A second left segment of the left brake light is aligned with a first right segment of the right brake light along a direction of a second extension line. A second right segment of the right brake light is aligned with a second end of the extended brake light assembly along a direction of a third extension line. When the vehicle is braked, the left brake light, the right brake light and the extended brake light assembly are lit and viewed as a planar warning pattern to enhance warning effect.

9 Claims, 12 Drawing Sheets

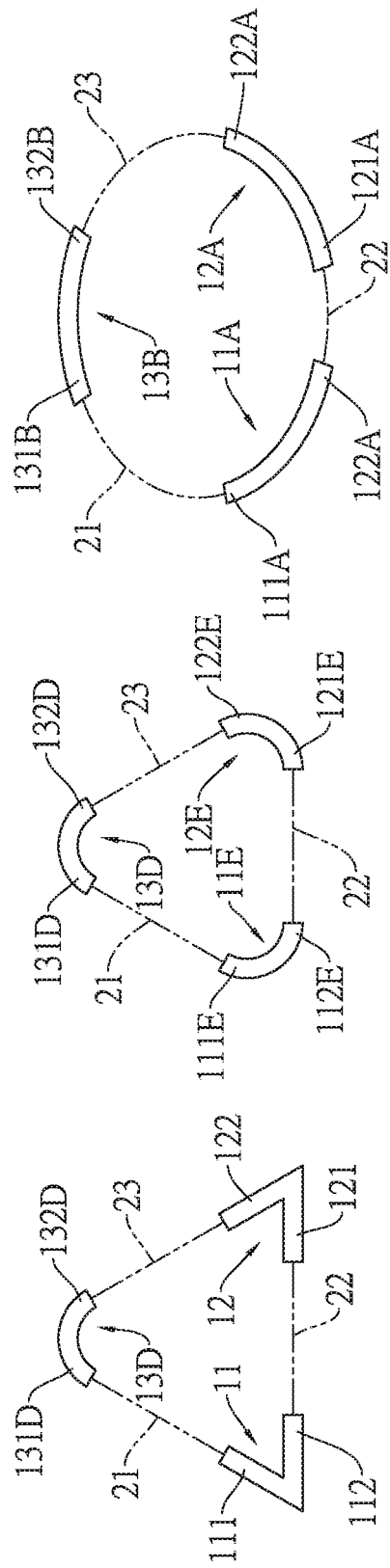

BRAKE WARNING LIGHT

BACKGROUND OF THE INVENTION

1. Field of the Invention

The present invention relates to a warning light and, more particularly, to a brake warning light with an enhanced warning effect.

2. Description of the Related Art

Vehicles on the roads may encounter traffic accidents due to many unexpected situations. One of the dangerous traffic accidents is rear-end collision, which usually takes place upon traffic jam or speeding. In the event of traffic jam, as a result of a frequently decelerating car in the front, the driver in the car behind is prone to eye strain and drowsiness. Therefore, there are chances that a rear-end collision happens when the driver in the car behind is late to react to a suddenly braked car in the front.

As far as a rear-end collision is concerned, in a minor situation vehicle may be damaged, and in a serious situation the driver or passenger(s) may be injured or lose their lives. One of the causes behind the rear-end collision resides in conventional brake warning lights that are unsatisfactory in terms of warning effect.

SUMMARY OF THE INVENTION

An objective of the present invention is to provide a brake warning light providing enhanced warning effect and driving safety.

To achieve the foregoing objective, the brake warning light is mounted on a rear portion of a vehicle and is viewed as a planar geometric shape visually outlined by a boundary of the brake warning light when viewed at a viewing point located behind the vehicle. A direction defined by the viewing point and a geometric center of the planar geometric shape is perpendicular to the planar geometric shape. The brake warning light includes an extended brake light assembly, a left brake light and a right brake light.

The extended brake light assembly has a first extended segment and a second extended segment.

The second extended segment is connected with the first extended segment.

The left brake light is spaced apart from the extended brake light assembly by a first extension line and has a first left segment and a second left segment.

The first left segment is aligned with the first extended segment of the extended brake light assembly along a direction of the first extension line.

The right brake light is spaced apart from the left brake light by a second extension line, is spaced apart from the extended brake light assembly by a third extension line, and has a first right segment and a second right segment.

The first right segment is aligned with the second left segment of the left brake light along a direction of the second extension line.

The second right segment is aligned with the second extended segment of the extended brake light assembly along a direction of the third extension line.

When the left brake light, the right brake light and the extended brake light assembly are simultaneously lit, a warning pattern with the planar geometric shape is viewed from the viewing point.

As can be seen from the foregoing description of the brake warning light, the left brake light, the right brake light and the extended brake light assembly are respectively aligned with one another along the direction of a corresponding extension line to form a planar geometric shape when lit, thereby enhancing a warning effect for prevention of rear-end collision and increasing driving safety.

Other objectives, advantages and novel features of the invention will become more apparent from the following detailed description when taken in conjunction with the accompanying drawings.

BRIEF DESCRIPTION OF THE DRAWINGS

FIG. 7 is a schematic view of a seventh embodiment in accordance with the present invention;

FIG. 8 is a schematic view of an eighth embodiment in accordance with the present invention;

FIG. 9 is a schematic view of a ninth embodiment in accordance with the present invention;

DETAILED DESCRIPTION OF THE INVENTION

All the following embodiments of brake warning lights are mounted on a rear portion of a vehicle and are viewed as planar geometric shapes visually outlined by boundaries of the brake warning lights when viewed at a viewing point located behind the vehicle 10. A direction defined by the viewing point and a geometric center of each planar geometric shape is perpendicular to the planar geometric shape.

Figure 1A:
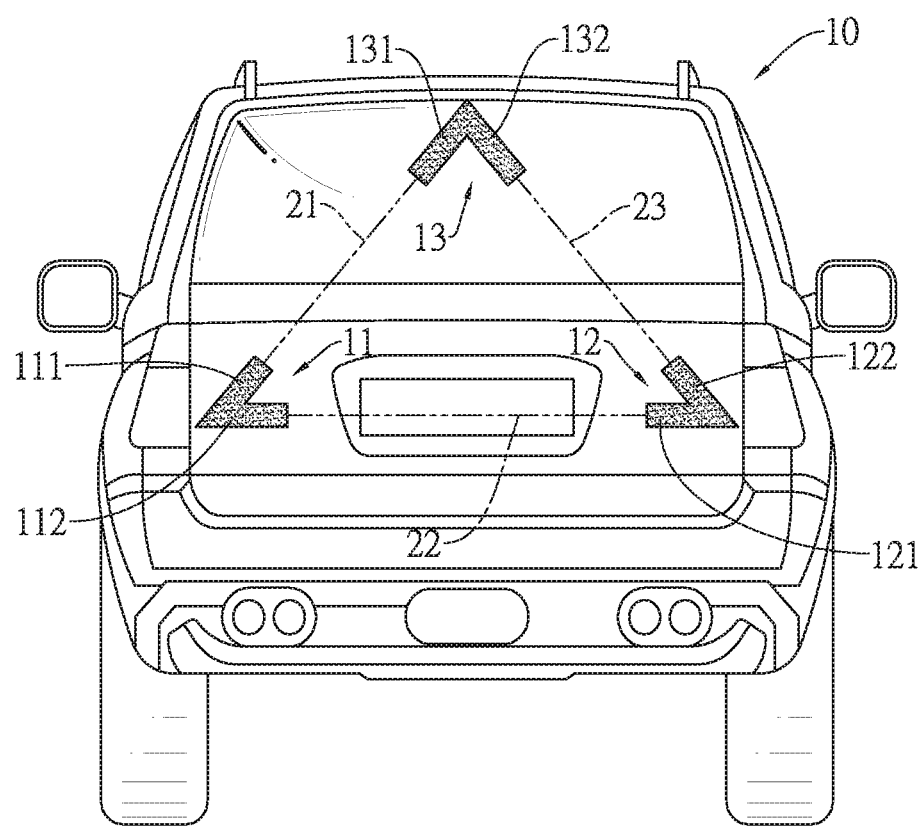
FIG. 1A is a schematic view of one option of a first embodiment of a brake warning light in accordance with the present invention.
Figure 1B:
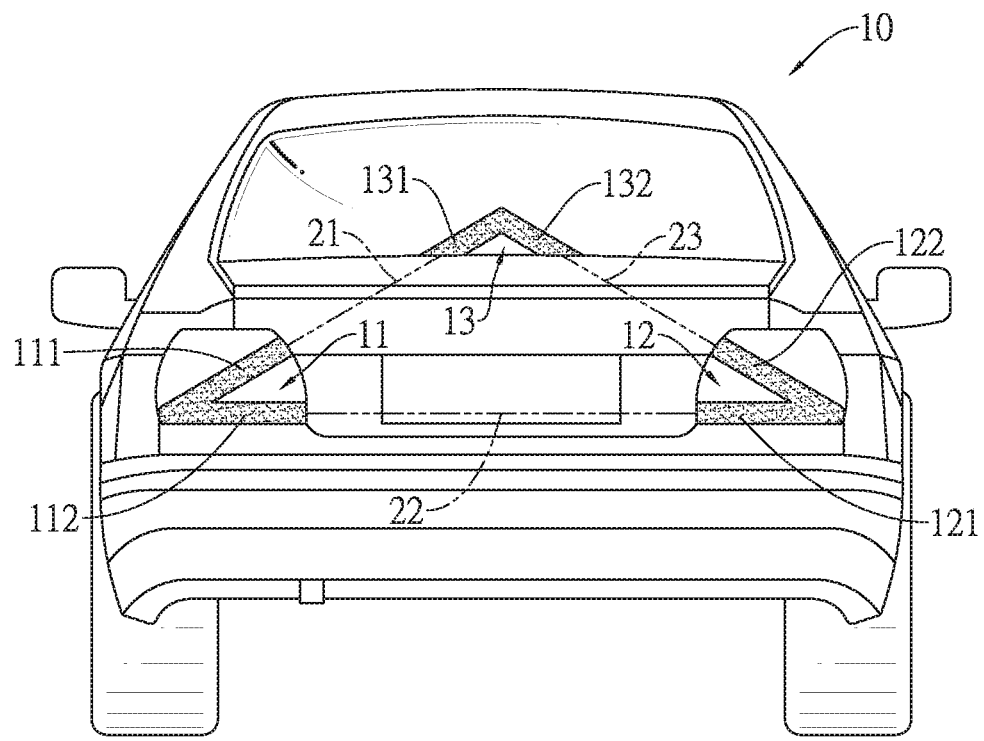
FIG. 1B is a schematic view of another option of the brake warning light in FIG. 1A.

With reference to FIGS. 1A and 1B, a first embodiment of a brake warning light in accordance with the present invention is applied to a rear portion of a vehicle 10 to alert the driver behind the vehicle 10. The vehicle 10 may be, for example, a sport utility vehicle (SUV) as shown in FIG. 1A or sedan as shown in FIG. 1B. The brake warning light includes a left brake light 11, a right brake light 12 and an extended brake light assembly. The left brake light 11 and the extended brake light assembly are spaced apart by a first extension line 21. The left brake light 11 and the right brake light 12 are spaced apart by a second extension line 22. The right brake light 12 is spaced apart from the extended brake light assembly by a third extension line 23. The left brake light 11, the right brake light 12 and the extended brake light assembly are formed by light-emitting diodes (LED) but not limited thereto.

In the present embodiment, the extended brake light assembly has a top brake light 13 located above and between the left brake light 11 and the right brake light 12. When viewed along the defined view direction, the planar geometric shape formed by the brake warning light is an acute triangle. The left brake light 11 has a first left segment 111 and a second left segment 112 connected with the first left segment 111 to take a V-shaped form. The right brake light 12 has a first right segment 121 and a second right segment 122 connected with the first right segment 121 to take a V-shaped form. The top brake light 13 has a first top segment 131 and a second top segment 132 connected with the first top segment 131 to take a V-shaped form. On the acute triangle, the three acute angles are respectively included between the first left segment 111 and the second left segment 112, between the first right segment 121 and the second right segment 122, and between the first top segment 131 and the second top segment 132, the three vertices are respectively located on intersected points of the first left segment 111 and the second left segment 112, the first right segment 121 and the second right segment 122, and the first top segment 131 and the second top segment 132. The first left segment 111 of the left brake light 11 is aligned with the first top segment 131 of the top brake light 13 along a direction of the first extension line 21 between the two vertices defined by the left brake light 11 and the top brake light 13. The second left segment 112 of the left brake light 11 is aligned with the first right segment 121 of the right brake light 12 in a direction along the second extension line 22 between the two vertices defined by the left brake light 11 and the right brake light 12. The second extension line 22 may be horizontal. The second right segment 122 of the right brake light 12 is aligned with the second top segment 132 in a direction along the third extension line 23 between the two vertices defined by the right brake light 12 and the top brake light 13.

When the left brake light 11, the right brake light 12 and the top brake light 13 simultaneously are lit, the planar geometric shape of the brake warning light is triangular. According to psychology, a symbol with a complete form can strengthen stimulation of viewer's senses in viewing and memorizing the symbol to quickly detect the presence of a braking vehicle in the front so as to avoid unresponsiveness or long response latency of the driver behind the brake warning light arising from eye strain or distraction and achieve the purpose of driving safety.

Figure 2A:
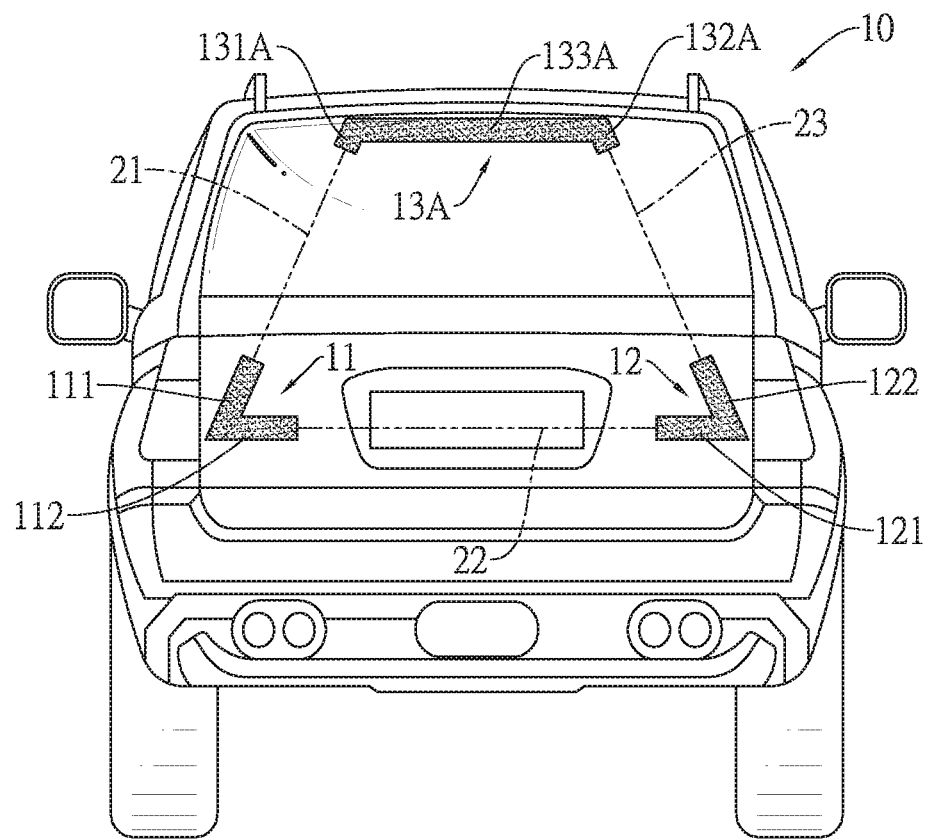
FIG. 2A is a schematic view of one option of a second embodiment of a brake warning light in accordance with the present invention.
Figure 2B:
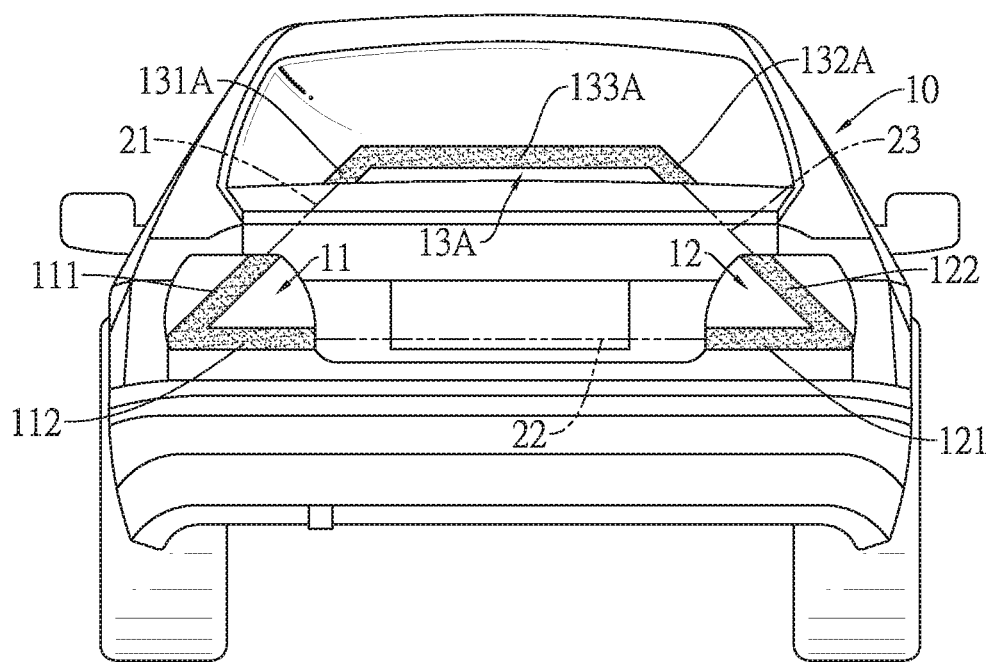
FIG. 2B is a schematic view of another option of the brake warning light in FIG. 2A.

With reference to FIGS. 2A and 2B, a second embodiment of a brake warning light in accordance with the present invention differs from the first embodiment in the shape of the top brake light 13A and the planar geometric shape of the brake warning light.

The top brake light 13A has a left top segment 131A, a right top segment 132A, and a middle top segment 133A connected between the left top segment 131A and the right top segment 132A. The middle top segment 133A is parallel to the second left segment 112 of the left brake light 11 and the first right segment 121 of the right brake light 12. By virtue of the middle top segment 133A, the top brake light 13A is longer than the top brake light 13 in the first embodiment to strengthen the warning effect. When the left brake light 11, the right brake light 12 and the top brake light 13A simultaneously are lit, the planar geometric shape of the brake warning light is trapezoidal.

Figure 3A:
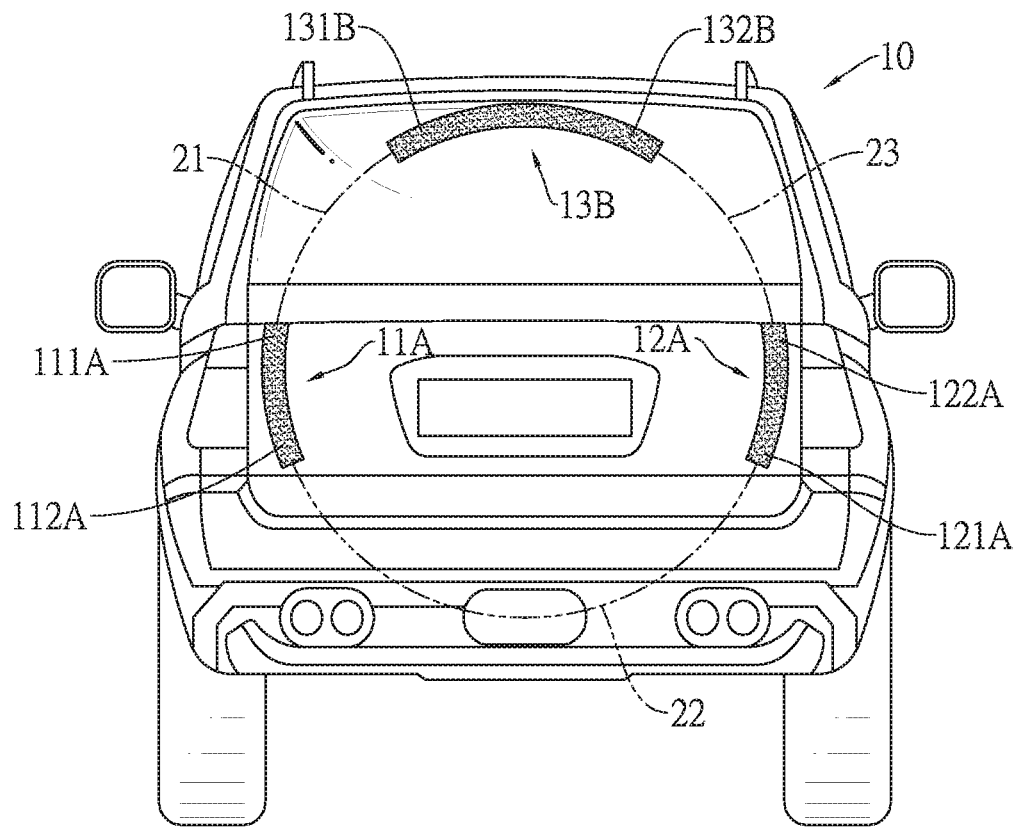
FIG. 3A is a schematic view of one option of a third embodiment of a brake warning light in accordance with the present invention.
Figure 3B:
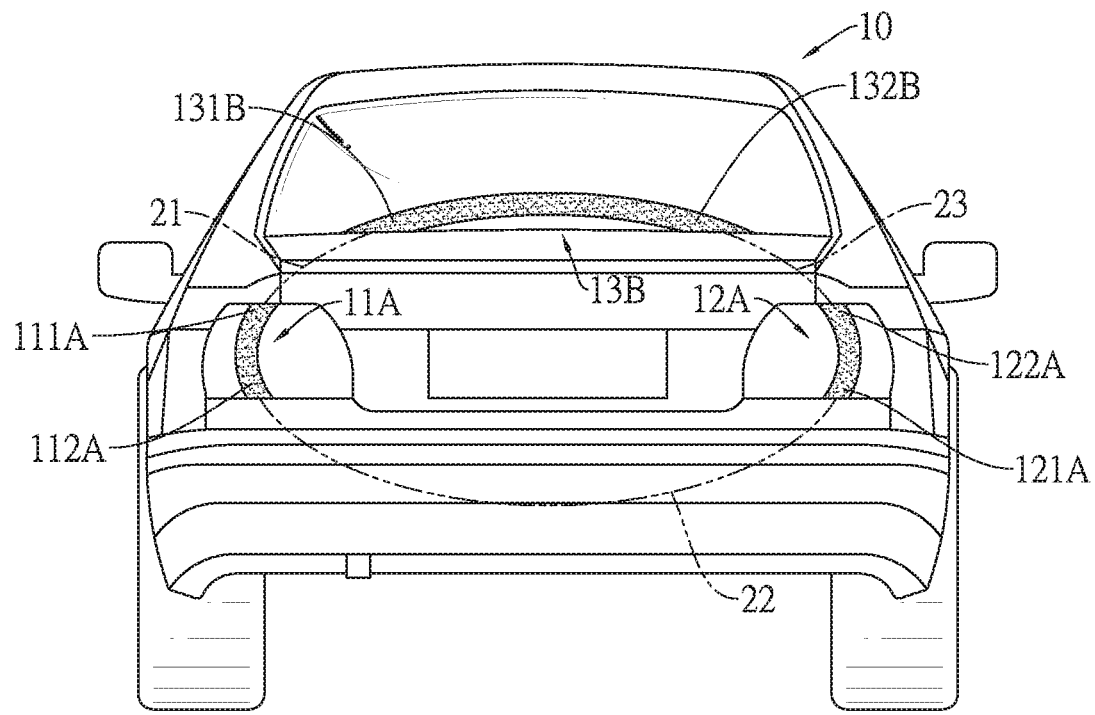
FIG. 3B is a schematic view of another option of the brake warning light in FIG. 3A.

With reference to FIGS. 3A and 3B, a third embodiment of a brake warning light in accordance with the present invention differs from the first embodiment in the shapes of the left brake light 11A, the right brake light 12A and the top brake light 13B and the planar geometric shape of the brake warning light.

The left brake light 11A, the right brake light 12A and the top brake light 13B are arced. The left brake light 11A has a first arc length, the right brake light 12A has a second arc length, and the top brake light 13B has a third arc length. The first arc length is equal to the second arc length and shorter than the third arc length.

The left brake light 11A, the right brake light 12A and the top brake light 13B are located on a circle or on an ellipse and are spaced apart from one another. A first left segment 111A of the left brake light 11A is adjacent to a first top segment 131B of the top brake light 13B and is spaced apart from the first top segment 131B of the top brake light 13B by a first extension line 21. A second left segment 112A of the left brake light 11A is adjacent to a first right segment 121A of the right brake light 12A and is spaced apart from the first right segment 121A of the right brake light 12A by a second extension line 22. A second right segment 122A of the right brake light 12A is adjacent to a second top segment 132B of the top brake light 13B and is spaced apart from the second top segment 132B of the top brake light 13B by a third extension line 23. The first extension line 21, the second extension line 22 and the third extension line 23 are arced. The first extension line 21 is equal to the third extension line 23 and is shorter than the second extension line 22 in arc length. The first left segment 111A of the left brake light 11A is aligned with the first top segment 131B of the top brake light 13B along a direction of the first extension line 21. The second left segment 112A of the left brake light 11A is aligned with the first right segment 121A of the right brake light 12A along a direction of the second extension line 22. The second right segment 122A of the right brake light 12A is aligned with the second top segment 132B of the top brake light 13B along a direction of the third extension line 23. When the left brake light 11A, the right brake light 12A and the top brake light 13B simultaneously are lit, the planar geometric shape of the brake warning light is circular or elliptical.

Figure 4A:
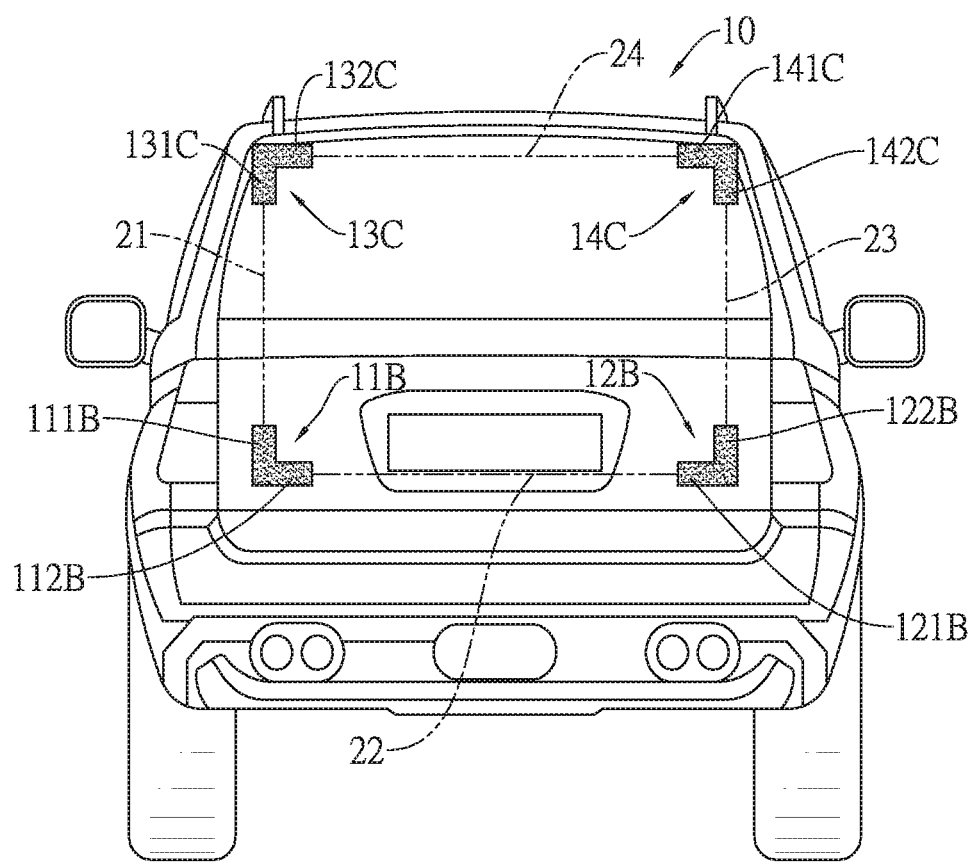
FIG. 4A is a schematic view of one option of a fourth embodiment of a brake warning light in accordance with the present invention.
Figure 4B:
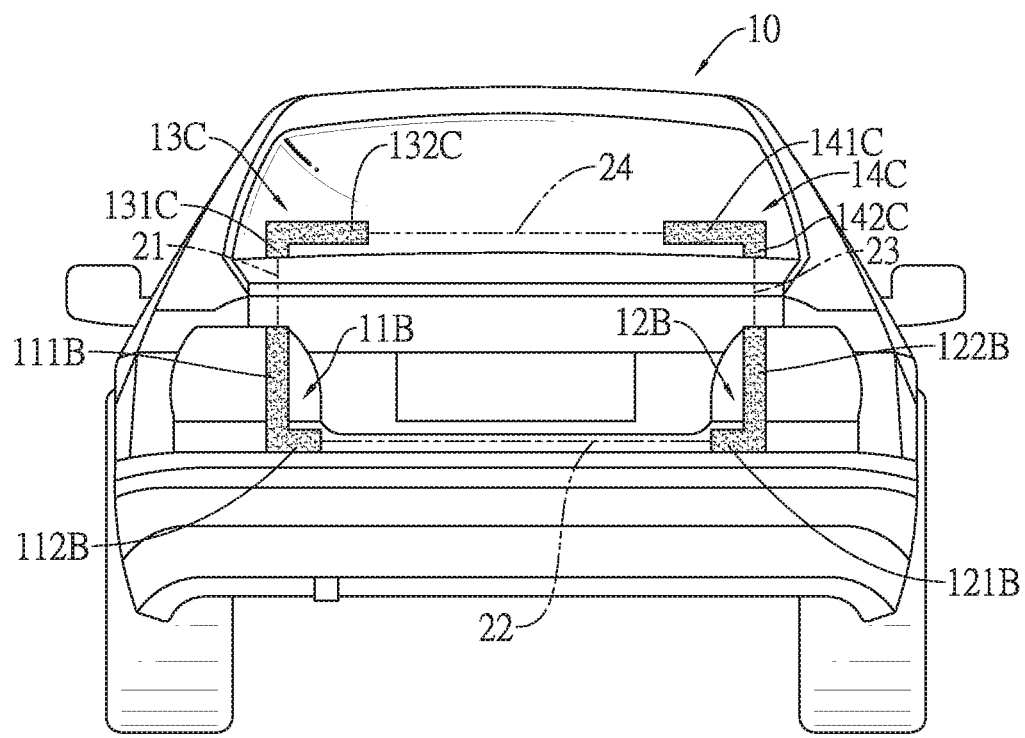
FIG. 4B is a schematic view of another option of the brake warning light in FIG. 4A.

With reference to FIGS. 4A and 4B, a fourth embodiment of a brake warning light in accordance with the present invention differs from the first embodiment in the shapes of the left brake light 11B and the right brake light 12B, the planar geometric shape of the brake warning light, and the composition of the extended brake light assembly.

The extended brake light assembly includes a left top brake light 13C and a right top brake light 14C. The left top brake light 13C has a first left top segment 131C and a second left top segment 132C. The right top brake light 14C has a first right top segment 141C and a second right top segment 142C. The first right top segment 141C of the right top brake light 14C is spaced apart from the second left top segment 132C of the left top brake light 13C by a fourth extension line 24. The fourth extension line 24 is a horizontal line. The first left segment 111B and the second left segment 112B of the left brake light 11B are connected to take a right-angled L-shaped form. The first right segment 121B and the second right segment 122B of the right brake light 12B are connected to take a right-angled L-shaped form. The first left top segment 131C and the second left top segment 132C of the left top brake light 13C are connected to take a right-angled L-shaped form. The first right top segment 141C and the second right top segment 142C of the right top brake light 14C are connected to take a right-angled L-shaped form. In other words, the planar geometric shape of the brake warning light in the present embodiment is rectangular.

The left top brake light 13C and the right top brake light 14C are directly respectively located above the left brake light 11B and the right brake light 12B. The first left segment 111B of the left brake light 11B is vertically aligned with the first left top segment 131C of the left top brake light 13C along a direction of the first extension line 21. The first extension line 21 is a vertical line.

The second left segment 112B of the left brake light 11 is horizontally aligned with the first right segment 121B of the right brake light 12B along a direction of the second extension line 22. The second extension line 22 is a horizontal line.

The second right segment 122B of the right brake light 12B is vertically aligned with the second top right segment 142C of the right top brake light 14C along a direction of the third extension line 23. The third extension line 23 is a vertical line.

The second left top segment 132C of the left top brake light 13C is horizontally aligned with the first right top segment 141C of the right brake light 14C along a direction of the fourth extension line 24. When the left brake light 11B, the right brake light 12B, the left top brake light 13C and the right top brake light 14C simultaneously are lit, the planar geometric shape of the brake warning light is rectangular. The first extension line 21 is parallel to the third extension line 23. The second extension line 22 is parallel to the fourth extension line 24.

In FIG. 4B, the first left segment 111B is longer than the second left segment 112B in the left brake light 11B, the second right segment 122B is longer than the first right segment 121B in the right brake light 12B, the second left top segment 132C is longer than the first left top segment 131C in the left top brake light 13C, and the first right top segment 141C is longer than the second right top segment 142C in the right top brake light 14C.

Figures 5, 6:
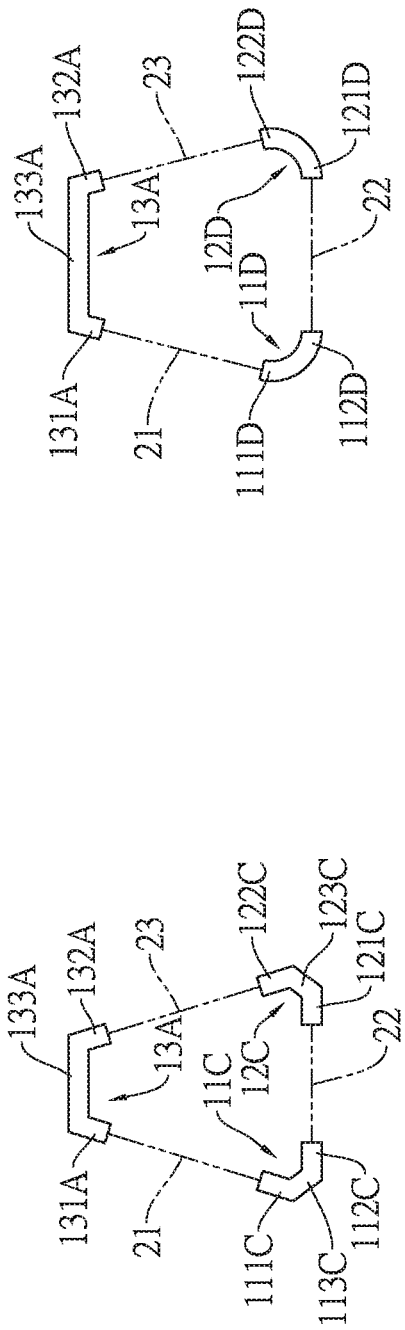
FIG. 5 is a schematic view of a fifth embodiment in accordance with the present invention.
FIG. 6 is a schematic view of a sixth embodiment in accordance with the present invention.

With reference to FIGS. 2A, 2B and 5, a fifth embodiment of a brake warning light in accordance with the present invention differs from the second embodiment in the shapes of the left brake light 11C and the right brake light 12C. In the present embodiment, the left brake light 11C includes a first left segment 111C, a second left segment 112C and a third left segment 113C connected between the first left segment 111C and the second left segment 112C. The right brake light 12C includes a first right segment 121C, a second right segment 122C and a third right segment 123C connected between the first right segment 121C and the second right segment 122C. When the left brake light 11C, the right brake light 12C and the top brake light 13A simultaneously are lit, the planar geometric shape of the brake warning light is hexagonal.

With reference to FIGS. 2 and 6, a sixth embodiment of a brake warning light in accordance with the present invention differs from the second embodiment in the shapes of the left brake light 11D and the right brake light 12D. In the present embodiment, the left brake light 11D and the right brake light 12D are arced, the left brake light 11D has a first arc length, the right brake light 12D has a second arc length, and the first arc length is equal to the second arc length. The left brake light 11D has a first end 111D and a second end 112D, and the right brake light 12D has a first end 121D and a second end 122D. The first end 111D of the left brake light 11D is aligned with the left top segment 131A of the top brake light 13A along a direction of the first extension line 21. The second end 112D of the left brake light 11D is aligned with the first end 121D of the right brake light 12D along a direction of the second extension line 22. The second end 122D of the right brake light 12D is aligned with the right top segment 132A of the top brake light 13A along a direction of the third extension line 23. When the left brake light 11D, the right brake light 12D and the top brake light 13A simultaneously are lit, the planar geometric shape of the brake warning light is quasi-trapezoidal with two rounded bottom corners.

With reference to FIGS. 1 and 7, a seventh embodiment of a brake warning light in accordance with the present invention differs from the first embodiment in the shape of the top brake light 13D. The top brake light 13D is arced and has a first end 131D and a second end 132D. The first end 131D of the top brake light 13D is aligned with the first left segment 111 of the left brake light 11 in the direction along the first extension line 21. The second end 132D of the top brake light 13D is aligned with the second right segment 122 of the right brake light 12 in the direction along the third extension line 23. When the left brake light 11, the right brake light 12 and the top brake light 13D simultaneously are lit, the planar geometric shape of the brake warning light is quasi-triangular with a rounded top corner.

With reference to FIGS. 7 and 8, an eighth embodiment of a brake warning light in accordance with the present invention differs from the seventh embodiment in the shapes of the left brake light 11E and the right brake light 12E. The left brake light 11E and the right brake light 12E are arced. The left brake light 11E has a first arc length. The right brake light 12E has a second arc length. The first arc length is equal to the second arc length. The left brake light 11E has a first left segment 111E and a second left segment 112E. The right brake light 12E has a first right segment 121E and a second right segment 122E. The first top segment 131D of the top brake light 13D is aligned with the first left segment 111E of the left brake light 11E in the direction along the first extension line 21. The second top segment 132D of the top brake light 13D is aligned with the second right segment 122E of the right brake light 12E in the direction along the third extension line 23. The second left segment 112E of the left brake light 11E is aligned with the first right segment 121E of the right brake light 12E in the direction along the second extension line 22. When the left brake light 11E, the right brake light 12E and the top brake light 13D simultaneously are lit, the planar geometric shape of the brake warning light is quasi-triangular with three rounded corners.

With reference to FIGS. 3A, 3B and 9, a ninth embodiment of a brake warning light in accordance with the present invention differs from the third embodiment in the shapes of the left brake light 11E and the right brake light 12E. The first arc length of the left brake light 11A is equal to the second arc length of the right brake light 12A and the third arc length of the top brake light 13B. The first extension arc 21 is equal to the third extension arc 23 and is longer than the second extension arc 22. When the left brake light 11A, the right brake light 12A and the top brake light 13B simultaneously are lit, the planar geometric shape of the brake warning light is elliptical.

Figure 10:
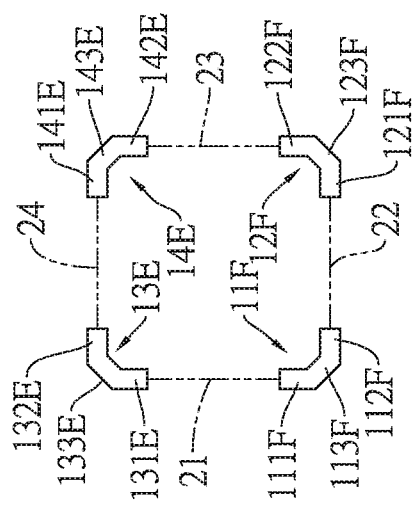
FIG. 10 is a schematic view of a tenth embodiment in accordance with the present invention.

With reference to FIGS. 4A, 4B and 10, a tenth embodiment of a brake warning light in accordance with the present invention differs from the fourth embodiment in the shapes of the left brake light 11F, the right brake light 12F, the left top brake light 13E and the right top brake light 14E. The left brake light 11F has a first left segment 111F, a second left segment 112F and a third left segment 113F connected between and obliquely connected with the first left segment 111F and the second left segment 112F. The right brake light 12F has a first right segment 121F, a second right segment 122F and a third right segment 123F connected between and obliquely connected with the first right segment 121F and the second right segment 122F. The left top brake light 13E has a first left top segment 131E, a second left top segment 132E and a third left top segment 133E connected between and obliquely connected with the first left top segment 131E and the second left top segment 132E. The right top brake light 14E has a first right top segment 141E, a second right top segment 142E and a third right top segment 143E connected between and obliquely connected with the first right top segment 141E and the second right top segment 142E. The first left segment 111F of the left brake light 11F is parallel to the second right segment 122F of the right brake light 12F. The second left segment 112F of the left brake light 11F is parallel to the second left top segment 132E of the left top brake light 13E. The third left segment 113F of the left brake light 11F is parallel to the first right top segment 141E of the right top brake light 14E. The third right segment 123F of the right brake light 12F is parallel to the third left top segment 133E of the left top brake light 13E. The first left top segment 131E of the left top brake light 13E is parallel to the second right top segment 142E of the right top brake light 14E. When the left brake light 11F, the right brake light 12F, the left top brake light 13E and the right top brake light 14E simultaneously are lit, the planar geometric shape of the brake warning light is octagonal.

Figure 11:
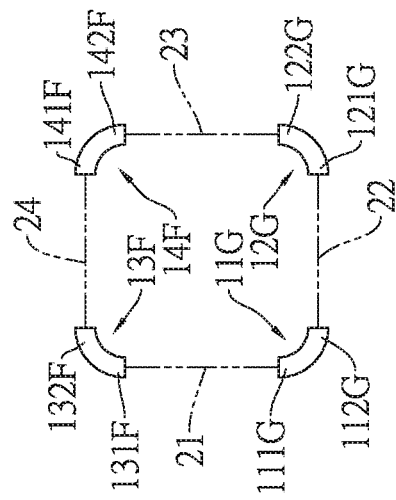
FIG. 11 is a schematic view of an eleventh embodiment in accordance with the present invention.

With reference to FIGS. 4A, 4B and 11, an eleventh embodiment of a brake warning light in accordance with the present invention differs from the fourth embodiment in the shapes of the left brake light 11G, the right brake light 12G, the left top brake light 13F and the right top brake light 14F. The left brake light 11G, the right brake light 12G, the left top brake light 13F and the right top brake light 14F are arced and are equal in arc length. When the left brake light 11G, the right brake light 12G, the left top brake light 13F and the right top brake light 14F simultaneously are lit, the planar geometric shape of the brake warning light is rectangular with four rounded corners.

Figure 12:
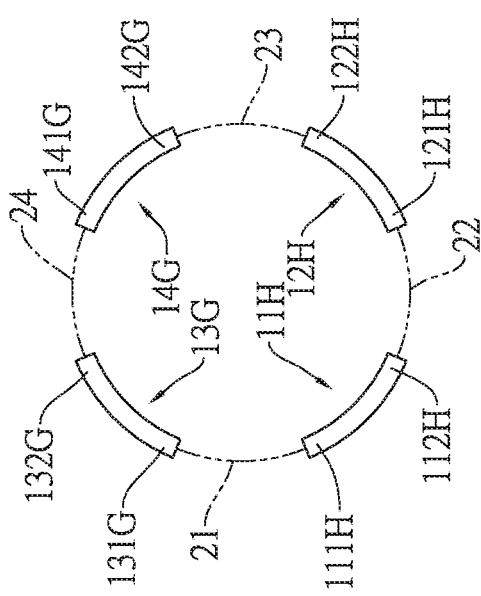
FIG. 12 is a schematic view of a twelfth embodiment in accordance with the present invention.

With reference to FIGS. 4A, 4B, and 12, a twelfth embodiment of a brake warning light in accordance with the present invention differs from the fourth embodiment in the shapes of the left brake light 11H, the right brake light 12H, the left top brake light 13G and the right top brake light 14G. The left brake light 11H, the right brake light 12H, the left top brake light 13G and the right top brake light 14G are arced, are equal in arc length, and are spaced apart from one another. The first extension line 21, the second extension line 22, the third extension line 23 and the fourth extension line 24 are also arced. The left brake light 11H has a first left segment 111H and a second left segment 112H. The right brake light 12H has a first right segment 121H and a second right segment 122H. The left top brake light 13G has a first left top segment 131G and a second left top segment 132G. The right top brake light 14G has a first right top segment 141G and a second right top segment 142G.

The first left segment 111H of the left brake light 11H is aligned with the first left top segment 131G of the left top brake light 13G along a direction of the first extension line 21. The second left segment 112H of the left brake light 11H is aligned with the first right segment 121H of the right brake light 12H along a direction of the second extension line 22. The second right top segment 142G of the right top brake light 14G is aligned with the second right segment 122H of the right brake light 12H along a direction of the third extension line 23. The second left segment 132G of the left top brake light 13G is aligned with the first right top segment 141G of the right top brake light 14G along a direction of the fourth extension line 24. When the left brake light 11H, the right brake light 12H, the left top brake light 13G and the right top brake light 14G simultaneously are lit, the planar geometric shape of the brake warning light is circular.

Figure 13:
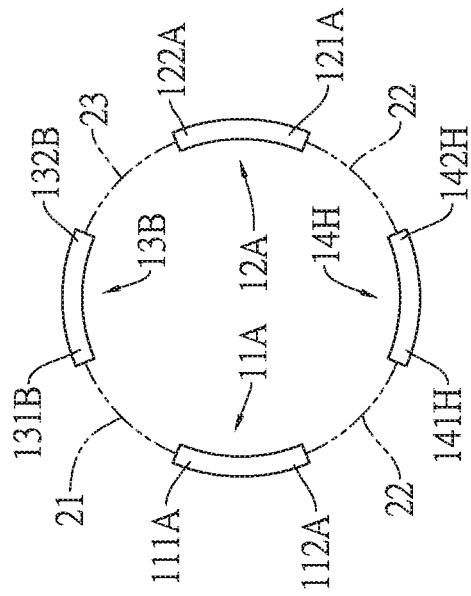
FIG. 13 is a schematic view of a thirteenth embodiment in accordance with the present invention.

With reference to FIGS. 3A, 3B and 13, a twelfth embodiment of a brake warning light in accordance with the present invention differs from the fourth embodiment in that the extended brake light assembly has a top brake light 13B and a bottom brake light 14H. The top brake light 13B is located above the left brake light 11A and the right brake light 12A, and is respectively spaced apart from the left brake light 11A and the right brake light 12A by the first extension line 21 and the third extension line 23. The bottom brake light 14H is located below the left brake light 11A and the right brake light 12A, is mounted on the second extension line 22, and has a first bottom segment 141H and a second bottom segment 142H. The left brake light 11A, the right brake light 12A, the top brake light 13B and the bottom brake light 14H are spaced apart from one another. The bottom brake light 14H has a fourth arc length. The first arc length, the second arc length, the third arc length and the fourth arc length are all equal.

The second left segment 112A of the left brake light 11A is aligned with the first bottom segment 141B of the bottom brake light 14H along the direction of an uncovered part of the second extension line 22 between the left brake light 11A and the bottom brake light 14H. The first right segment 121A of the right brake light 12A is aligned with the second bottom segment 142H of the bottom brake light 14H along a direction of another uncovered part of the second extension line 22 between the right brake light 12A and the bottom brake light 14H. When the left brake light 11A, the right brake light 12A, the top brake light 13B and the bottom brake light 14H simultaneously are lit, the planar geometric shape of the brake warning light is circular.

The foregoing left brake light, right brake light and the extended brake light assembly include but are not limited to the shapes as disclosed. When the left brake light, right brake light and the extended brake light assembly of the brake warning light mounted on a rear portion of a vehicle are simultaneously lit, a warning pattern with a planar geometric shape is shown to provide an enhanced warning effect to the driver behind the brake warning light, thereby preventing the chance of rear-end collision from happening for assurance of increased driving safety.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:
an extended brake light assembly having:
a first extended segment; and
a second extended segment connected with the first extended segment;
a left brake light spaced apart from the extended brake light assembly by a first extension line and having:
a first left segment aligned with the first extended segment of the extended brake light assembly along a direction of the first extension line; and
a second left segment; and
a right brake light spaced apart from the left brake light by a second extension line, spaced apart from the extended brake light assembly by a third extension line, and having:
a first right segment aligned with the second left segment of the left brake light along a direction of the second extension line; and
a second right segment aligned with the second extended segment of the extended brake light assembly along a direction of the third extension line;
wherein
the extended brake light assembly includes a top brake light located above and between the left brake light and the right brake light and having:
a first top segment; and
a second top segment connected with the first top segment to take a V-shaped form;
the left brake light takes a V-shaped form with the first left segment aligned with the first top segment of the top brake light along the direction of the first extension line and the second left segment aligned with the first right segment of the right brake light along the direction of the second extension line; and
the right brake light takes a V-shaped form with the second right segment aligned with the second top segment of the top brake light along the direction of the third extension line;
wherein when the left brake light, the right brake light and the extended brake light assembly are simultaneously lit, a warning pattern with the planar geometric shape is viewed from the viewing point and the planar geometric shape is triangular.

2. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:
an extended brake light assembly having:
a first extended segment; and
a second extended segment connected with the first extended segment;
a left brake light spaced apart from the extended brake light assembly by a first extension line and having:
a first left segment aligned with the first extended segment of the extended brake light assembly along a direction of the first extension line; and
a second left segment; and
a right brake light spaced apart from the left brake light by a second extension line, spaced apart from the extended brake light assembly by a third extension line, and having:
a first right segment aligned with the second left segment of the left brake light along a direction of the second extension line; and
a second right segment aligned with the second extended segment of the extended brake light assembly along a direction of the third extension line;
wherein
the extended brake light assembly includes a top brake light located above and between the left brake light and the right brake light and having:
a left top segment;
a right top segment; and
a middle top segment connected between the left top segment and the right top segment;
the left brake light takes a V-shaped form with the first left segment aligned with the left top segment of the top brake light along the direction of the first extension line and the second left segment aligned with the first right segment of the right brake light along the direction of the second extension line; and
the right brake light takes a V-shaped form with the second right segment aligned with the right top segment of the top brake light along the direction of the third extension line;
wherein when the left brake light, the right brake light and the extended brake light assembly are simultaneously lit, a warning pattern with the planar geometric shape is viewed from the viewing point and the planar geometric shape is trapezoidal.

3. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:
an extended brake light assembly having:
a first extended segment; and
a second extended segment connected with the first extended segment;
a left brake light spaced apart from the extended brake light assembly by a first extension line and having:
a first left segment aligned with the first extended segment of the extended brake light assembly along a direction of the first extension line; and
a second left segment; and
a right brake light spaced apart from the left brake light by a second extension line, spaced apart from the extended brake light assembly by a third extension line, and having:
a first right segment aligned with the second left segment of the left brake light along a direction of the second extension line; and
a second right segment aligned with the second extended segment of the extended brake light assembly along a direction of the third extension line;
wherein
the extended brake light assembly includes a top brake light located above and between the left brake light and the right brake light and having:
a left top segment;
a right top segment; and a middle top segment connected between the left top segment and the right top segment;

the left brake light includes a third left segment connected between the first left segment and the second left segment with the first left segment aligned with the left top segment of the top brake light along the direction of the first extension line and the second left segment aligned with the first right segment of the right brake light; and the right brake light includes a third right segment connected between the first right segment and the second right segment with the second right segment aligned with the right top segment of the top brake light along the direction of the third extension line;

wherein when the left brake light, the right brake light and the extended brake light assembly are simultaneously lit, a warning pattern with the planar geometric shape is viewed from the viewing point and the planar geometric shape is hexagonal.

4. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:

an extended brake light assembly having:
  a first extended segment; and
  a second extended segment connected with the first extended segment;

a left brake light spaced apart from the extended brake light assembly by a first extension line and having:
  a first left segment aligned with the first extended segment of the extended brake light assembly along a direction of the first extension line; and
  a second left segment; and a right brake light spaced apart from the left brake light by a second extension line, spaced apart from the extended brake light assembly by a third extension line, and having:
  a first right segment aligned with the second left segment of the left brake light along a direction of the second extension line; and
  a second right segment aligned with the second extended segment of the extended brake light assembly along a direction of the third extension line;

wherein
the extended brake light assembly includes a top brake light located above and between the left brake light and the right brake light and having:
  a left top segment;
  a right top segment; and
  a middle top segment connected between the left top segment and the right top segment;

the left brake light is arced with the first left segment aligned with the left top segment of the top brake light along the direction of the first extension line and the second left segment aligned with the first right segment of the right brake light along the direction of the second extension line; and the right brake light is arced with the second right segment aligned with the right top segment of the top brake light along the direction of the third extension line;

wherein when the left brake light, the right brake light and the extended brake light assembly are simultaneously lit, a warning pattern with the planar geometric shape is viewed from the viewing point and the planar geometric shape is quasi-trapezoidal with two rounded bottom corners.

5. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:

an extended brake light assembly having:
  a first extended segment; and
  a second extended segment connected with the first extended segment;

a left brake light spaced apart from the extended brake light assembly by a first extension line and having:
  a first left segment aligned with the first extended segment of the extended brake light assembly along a direction of the first extension line; and
  a second left segment; and a right brake light spaced apart from the left brake light by a second extension line, spaced apart from the extended brake light assembly by a third extension line, and having:
  a first right segment aligned with the second left segment of the left brake light along a direction of the second extension line; and
  a second right segment aligned with the second extended segment of the extended brake light assembly along a direction of the third extension line;

wherein
the extended brake light assembly is arced and includes a top brake light located above and between the left brake light and the right brake light and having:
  a first top segment; and
  a second top segment connected with the first top segment to take an arced form;

the left brake light takes a V-shaped form with the first left segment aligned with the first top segment of the top brake light along the direction of the first extension line and the second left segment aligned with the first right segment of the right brake light along the direction of the second extension line; and the right brake light takes a V-shaped form with the second right segment aligned with the second top segment of the top brake light along the direction of the third extension line;

wherein when the left brake light, the right brake light and the extended brake light assembly are simultaneously lit, a warning pattern with the planar geometric shape is viewed from the viewing point and the planar geometric shape is triangular with a rounded top corner.

6. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:

an extended brake light assembly having:
  a first extended segment; and
  a second extended segment connected with the first extended segment;

a left brake light spaced apart from the extended brake light assembly by a first extension line and having:

a first left segment aligned with the first extended segment of the extended brake light assembly along a direction of the first extension line; and a second left segment; and a right brake light spaced apart from the left brake light by a second extension line, spaced apart from the extended brake light assembly by a third extension line, and having:

a first right segment aligned with the second left segment of the left brake light along a direction of the second extension line; and a second right segment aligned with the second extended segment of the extended brake light assembly along a direction of the third extension line;

wherein the extended brake light assembly is arced and includes a top brake light located above and between the left brake light and the right brake light and having:

a first top segment; and a second top segment connected with the first top segment to take an arced form;

the left brake light takes an arced form with the first left segment aligned with the first top segment of the top brake light along the direction of the first extension line and the second left segment aligned with the first right segment of the right brake light along the direction of the second extension line; and the right brake light takes an arced form with the second right segment aligned with the second top segment of the top brake light along the direction of the third extension line;

wherein when the left brake light, the right brake light and the extended brake light assembly are simultaneously lit, a warning pattern with the planar geometric shape is viewed from the viewing point and the planar geometric shape is triangular with three rounded corners.

7. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:

an extended brake light assembly having:

a first extended segment; and a second extended segment connected with the first extended segment;

a left brake light spaced apart from the extended brake light assembly by a first extension line and having:

a first left segment aligned with the first extended segment of the extended brake light assembly along a direction of the first extension line; and a second left segment; and a right brake light spaced apart from the left brake light by a second extension line, spaced apart from the extended brake light assembly by a third extension line, and having:

a first right segment aligned with the second left segment of the left brake light along a direction of the second extension line; and a second right segment aligned with the second extended segment of the extended brake light assembly along a direction of the third extension line;

wherein the extended brake light assembly is arced and includes a top brake light located above and between the left brake light and the right brake light and having:

a first top segment; and a second top segment connected with the first top segment to take an arced form;

the left brake light takes an arced form with the first left segment aligned with the first top segment of the top brake light along the direction of the first extension line and the second left segment aligned with the first right segment of the right brake light along the direction of the second extension line;

the right brake light takes an arced form with the second right segment aligned with the second top segment of the top brake light along the direction of the third extension line; and the first extension line, the second extension line and the third extension line are arced;

wherein when the left brake light, the right brake light and the extended brake light assembly are simultaneously lit, a warning pattern with the planar geometric shape is viewed from the viewing point and the planar geometric shape is circular.

8. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:

an extended brake light assembly having:

a first extended segment; and a second extended segment connected with the first extended segment;

a left brake light spaced apart from the extended brake light assembly by a first extension line and having:

a first left segment aligned with the first extended segment of the extended brake light assembly along a direction of the first extension line; and a second left segment; and a right brake light spaced apart from the left brake light by a second extension line, spaced apart from the extended brake light assembly by a third extension line, and having:

a first right segment aligned with the second left segment of the left brake light along a direction of the second extension line; and a second right segment aligned with the second extended segment of the extended brake light assembly along a direction of the third extension line;

wherein the extended brake light assembly includes:

a left top brake light located above the left brake light and the right brake light and having:

a first left top segment; and a second left top segment connected with the first top segment to take a right-angled L-shaped form; and a right top brake light located above the left brake light and the right brake light, spaced apart from the left top brake light by a fourth extension line, and having:

a first right top segment horizontally aligned with the second left top segment of the left top brake light along a direction of the fourth extension; and a second right top segment connected with the first right top segment to take a right-angled L-shaped form;

the left brake light takes a right-angled L-shaped form with the first left segment vertically aligned with the first left top segment of the left top brake light along the direction of the first extension line and the second left top segment horizontally aligned with the first right segment of the right brake light along the direction of the second extension line; and the right brake light takes a right-angled L-shaped form with the second right segment vertically aligned with the second right top segment of the right top brake light along the direction of the third extension line;

wherein when the left brake light, the right brake light, the left top brake light and the right top brake light are simultaneously lit, a warning pattern with the planar geometric shape is viewed from the viewing point and the planar geometric shape is rectangular.

9. A brake warning light mounted on a rear portion of a vehicle and viewed as a planar geometric shape visually outlined by a boundary of the brake warning light when viewed at a viewing point located behind the vehicle, wherein a direction defined by the viewing point and a geometric center of the planar geometric shape is perpendicular to the planar geometric shape, the brake warning light comprising:

an extended brake light assembly having:
a first extended segment; and
a second extended segment connected with the first extended segment;

a left brake light spaced apart from the extended brake light assembly by a first extension line and having:
a first left segment aligned with the first extended segment of the extended brake light assembly along a direction of the first extension line; and
a second left segment; and a right brake light spaced apart from the left brake light by a second extension line, spaced apart from the extended brake light assembly by a third extension line, and having:

a first right segment aligned with the second left segment of the left brake light along a direction of the second extension line; and
a second right segment aligned with the second extended segment of the extended brake light assembly along a direction of the third extension line;

wherein
the extended brake light assembly includes:
a left top brake light being arced, located above the left brake light and the right brake light, and having:
a first left top segment; and
a second left top segment connected with the first top segment to take an arced form; and
a right top brake light located above the left brake light and the right brake light, spaced apart from the left top brake light by a fourth extension line, and having:
a first right top segment aligned with the second left top segment of the left top brake light along a direction of the fourth extension; and
a second right top segment connected with the first right top segment to take an arced form;

the left brake light is arced with the first left segment aligned with the first left top segment of the left top brake light along the direction of the first extension line and the second left top segment aligned with the first right segment of the right brake light along the direction of the second extension line;

the right brake light is arced with the second right segment aligned with the second right top segment of the right top brake light along the direction of the third extension line; and the first extension line, the second extension line, the third extension line and the fourth extension line are arced;

wherein when the left brake light, the right brake light, the left top brake light and the right top brake light are simultaneously lit, a warning pattern with the planar geometric shape is viewed from the viewing point and the planar geometric shape is circular.

* * * * *